United States Patent
Burke et al.

(10) Patent No.: US 10,114,999 B1
(45) Date of Patent: Oct. 30, 2018

(54) USING DYNAMIC OCCLUSION TO PROTECT AGAINST CAPTURING BARCODES FOR FRAUDULENT USE ON MOBILE DEVICES

(71) Applicant: Koupon Media, Inc., Addison, TX (US)

(72) Inventors: Robert J. Burke, Dallas, TX (US); Brian Alexander Reinhart, Addison, TX (US)

(73) Assignee: Koupon Media, Inc., Addison, TX (US)

( * ) Notice: Subject to any disclaimer, the term of this patent is extended or adjusted under 35 U.S.C. 154(b) by 0 days.

(21) Appl. No.: 15/491,751

(22) Filed: Apr. 19, 2017

Related U.S. Application Data

(60) Provisional application No. 62/429,666, filed on Dec. 2, 2016.

(51) Int. Cl.
  *G06K 7/10* (2006.01)
  *G06K 7/14* (2006.01)
  *G06K 19/06* (2006.01)

(52) U.S. Cl.
  CPC ....... *G06K 7/1491* (2013.01); *G06K 7/10732* (2013.01); *G06K 7/1413* (2013.01); *G06K 7/1465* (2013.01); *G06K 7/1473* (2013.01); *G06K 19/06028* (2013.01); *G06K 19/06112* (2013.01)

(58) Field of Classification Search
  CPC ....... G06K 19/06028; G06K 19/06112; G06K 7/1417; G06K 19/06037; G06K 7/1095; G06K 7/1413; G06K 7/1465; G06K 7/1404; G06K 7/1443; G06K 9/22
  USPC .................................................. 235/462.12
  See application file for complete search history.

(56) References Cited

U.S. PATENT DOCUMENTS

| | | | |
|---|---|---|---|
| 7,447,642 B2 | 11/2008 | Bodin | |
| 8,219,385 B2 | 6/2012 | Sprecher et al. | |
| 8,239,256 B2 | 8/2012 | Russel et al. | |
| 9,124,617 B2 | 9/2015 | Palumbo et al. | |

(Continued)

OTHER PUBLICATIONS

IncentiveTargeting, "Our Platform," available online at URL: <http://www.incentivetargeting.com/platform/>, at least as early as Apr. 29, 2010 (2 pages).
IncentiveTargeting, "Manufacturers: Your Insights in Action," available online at URL: <http://www.incentivetargeting.com/manufacturers/index.html, at least as early as Apr. 30, 2010 (2 pages).

(Continued)

*Primary Examiner* — Thien M Le
(74) *Attorney, Agent, or Firm* — Patent Capital Group

(57) ABSTRACT

Embodiments include technologies for applying dynamic occlusions to barcodes, which include determining a dynamic occlusion to be applied to a barcode, generating an object for displaying a series of images of the barcode with the dynamic occlusion, where the barcode is to be scannable at least once based on the series of images to be displayed, and providing the object for access by the mobile device. In specific embodiments, the dynamic occlusion includes a modification to a first portion of the barcode to create a first image of a modified barcode. In further specific embodiments, the object, when displayed for a first time period, is to render the first image of the modified barcode for at least a first interval occurring within the first time period. The first portion of the barcode is unscannable during the first interval and is at least partially scannable during one or more other intervals.

19 Claims, 4 Drawing Sheets

(56) References Cited

U.S. PATENT DOCUMENTS

| | | | |
|---|---|---|---|
| 9,565,263 | B2 | 2/2017 | Lin et al. |
| 9,704,083 | B2* | 7/2017 | Jiang ................ G06K 19/06112 |
| 9,881,319 | B2 | 1/2018 | Liu et al. |
| 9,930,078 | B2 | 3/2018 | Rajaram et al. |
| 9,961,112 | B2 | 5/2018 | Hasson et al. |
| 2002/0072975 | A1 | 6/2002 | Steele et al. |
| 2003/0004808 | A1 | 1/2003 | Elhaoussine et al. |
| 2004/0031038 | A1 | 2/2004 | Hugly et al. |
| 2006/0015404 | A1 | 1/2006 | Tran |
| 2008/0052169 | A1 | 2/2008 | O'Shea et al. |
| 2008/0133365 | A1 | 6/2008 | Sprecher et al. |
| 2008/0262928 | A1 | 10/2008 | Michaelis |
| 2009/0138338 | A1 | 5/2009 | Moukas et al. |
| 2009/0164597 | A1 | 6/2009 | Shuster |
| 2009/0216630 | A1 | 8/2009 | Carnahan |
| 2009/0234715 | A1 | 9/2009 | Russel et al. |
| 2010/0054242 | A1 | 3/2010 | Oliver et al. |
| 2010/0198678 | A1 | 8/2010 | Burst et al. |
| 2010/0198772 | A1 | 8/2010 | Silverman et al. |
| 2010/0229241 | A1 | 9/2010 | Liu |
| 2010/0274661 | A1 | 10/2010 | Aaltonen et al. |
| 2010/0274680 | A1 | 10/2010 | Carlson et al. |
| 2011/0035284 | A1 | 2/2011 | Moshfeghi |
| 2011/0082729 | A1 | 4/2011 | Carvallo et al. |
| 2011/0167458 | A1 | 7/2011 | Shenfield et al. |
| 2011/0191185 | A1 | 8/2011 | Schroeder et al. |
| 2012/0005026 | A1 | 1/2012 | Khan et al. |
| 2012/0136698 | A1* | 5/2012 | Kent .................. G06Q 20/3276 705/14.1 |
| 2012/0181329 | A1* | 7/2012 | Gratton ............. G06F 17/30879 235/375 |
| 2012/0190386 | A1* | 7/2012 | Anderson .............. G01C 15/04 455/456.3 |
| 2012/0239468 | A1 | 9/2012 | Yemeni et al. |
| 2012/0239489 | A1 | 9/2012 | Peretti et al. |
| 2013/0103495 | A1 | 4/2013 | Cloud |
| 2013/0138569 | A1 | 5/2013 | Yan et al. |
| 2013/0288994 | A1 | 10/2013 | Cooper et al. |
| 2014/0052532 | A1 | 2/2014 | Tsai et al. |
| 2014/0149502 | A1 | 5/2014 | Rajaram et al. |
| 2014/0282940 | A1 | 9/2014 | Williams et al. |
| 2015/0205984 | A1* | 7/2015 | Jiang ....................... G06K 19/08 235/437 |
| 2017/0237555 | A1 | 8/2017 | Roullier et al. |
| 2017/0243242 | A1* | 8/2017 | Chaikin ............. G06Q 30/0238 |
| 2017/0351917 | A1* | 12/2017 | Son .......................... G06K 9/22 |

OTHER PUBLICATIONS

Interactive Advertising Bureau, "IAB Platform Status Report: A Mobile Advertising Overview", Jul. 2008 (24 pages).
"GSI-128 Info, Resources and Education for the GS1-128 Symbology," Bar Code Graphics, Inc., available online at URL: https://web.archive.org/web/20140412181536/http://www.gs1-128.info/upc-coupon-barcodes/ at least as early as Apr. 12, 2014 (3 pages).
Marshall, Brain, "How UPC Bar Codes Work",HowStuffWorks.com. Available online at URL: <http://electronics.howstuffworks.com/gadgets/high-tech-gadgets/upc.htm>, Apr. 2000 (9 pages).
"GIF," Wikipedia, Available at URL: https://en.wikipedia.org/wiki/GIF at least as early as Oct. 9, 2001 (17 pages).
"Barcode Reader," Wikipedia, Available at URL: https://en.wikipedia.org/wiki/Barcode_reader#Housing, at least as early as Sep. 1, 2003 (6 pages).
Harris, Tom, "How Web Animation Works", HowStuffWorks.com. Available at URL: <http://computer.howstuffworks.com/web-animation.htm> Nov. 9, 2000 (15 pages).
U.S. Appl. No. 61/564,262 entitled "Validation and Redemption of Personalized Coupons," filed Nov. 28, 2011 (26 pages).
U.S. Appl. No. 13/607,537 entitled "Delivery, Validation, and Redemption of Electronic Coupons in a Mobile Network Environment", Todd J. Person et al. inventors, filed Sep. 7, 2012 (61 pages).
Preliminary Amendment in U.S. Appl. No. 13/607,537, filed Sep. 10, 2012 (4 pages).
Non-Final Office Action in U.S. Appl. No. 13/607,537, dated Dec. 24, 2013 (12 pages).
Non-Final Office Action in U.S. Appl. No. 13/607,537 dated Sep. 10, 2014 (13 pages).
Final Office Action in U.S. Appl. No. 13/607,537 dated May 20, 2015 (19 pages).
U.S. Appl. No. 13/607,582 entitled "Delivery, Validation and Redemption of Electronic Coupons in a Mobile Network Environment", filed Sep. 7, 2012, inventors Todd J. Person et al. (70 pages).
Preliminary Amendment in U.S. Appl. No. 13/607,582, filed Sep. 10, 2012 (4 pages).
Non-Final Office Action in U.S. Appl. No. 13/607,582 dated Jan. 17, 2014 (8 pages).
Non-Final Office Action in U.S. Appl. No. 13/607,582 dated Sep. 10, 2014 (13 pages).
Final Office Action in U.S. Appl. No. 13/607,582 dated May 6, 2015 (16 pages).
U.S. Appl. No. 13/607,610 entitled "Couponing Campaign Creation and Delivery of Electronic Coupons in a Mobile Network Environment", filed Sep. 7, 2012, inventors Todd J. Person, et al. (62 pages).
Preliminary Amendment in U.S. Appl. No. 13/607,610, filed Sep. 10, 2012 (4 pages).
Non-Final Office Action in U.S. Appl. No. 13/607,610 dated Jan. 17, 2014 (11 pages).
Non-Final Office Action in U.S. Appl. No. 13/607,610 dated Jan. 17, 2014 (14 pages).
Final Office Action in U.S. Appl. No. 13/607,610 dated May 6, 2015 (22 pages).
U.S. Appl. No. 61/802,178 entitled "Integrated Redemption of Electronic Coupons in a Mobile Network Environment," filed Mar. 15, 2013, inventor Timothy J. Riley (32 pages).
U.S. Appl. No. 14/214,761 entitled "Integrated Redemption of Electronic Coupons in a Mobile Network Environment," filed Mar. 15, 2014, inventor Timothy J. Riley (39 pages).
Non-Final Office Action in U.S. Appl. No. 14/214,761 dated May 5, 2016 (17 pages).
Final Office Action in U.S. Appl. No. 14/214,761 dated Jan. 13, 2017 (18 pages).
U.S. Appl. No. 15/040,826, filed Feb. 10, 2016, entitled Identity Aliasing and Policy Control for Electronic Coupons in a Mobile Network Environment, Inventors Robert J. Burke et al. (82 pages).
USPTO Nonfinal Office Action issued in U.S. Appl. No. 15/040,826 dated May 16, 2018; 23 pages.

* cited by examiner

USING DYNAMIC OCCLUSION TO PROTECT AGAINST CAPTURING BARCODES FOR FRAUDULENT USE ON MOBILE DEVICES

CROSS-REFERENCE TO RELATED APPLICATIONS

This patent application claims the benefit of priority under 35 U.S.C. § 119(e) of U.S. Provisional Application No. 62/429,666, filed Dec. 2, 2016, entitled "PROTECTION AGAINST SCREENSHOTS OF BARCODES ON MOBILE DEVICES USING DYNAMIC OCCLUSIONS," naming inventors Robert J. Burke, et al., which is hereby incorporated by reference in its entirety.

TECHNICAL FIELD

The disclosure generally relates to the field of electronic coupons, and more particularly to using dynamic occlusion to protect against capturing barcodes for fraudulent use on mobile devices.

BACKGROUND

In the past several years, mobile couponing has experienced tremendous growth due, in part, to the increasing prevalence of mobile device usage in everyday life. Mobile couponing provides a technique for offering, delivering and redeeming electronic coupons at retail without conversion to paper. With mobile couponing, a user can capture a coupon on a mobile device from a mobile coupon channel such as a magazine, newspaper, website, mobile web application, mobile application, or other media. To redeem the coupon at retail, the consumer typically presents the captured representation of the coupon, such as a barcode image, to a cashier who scans the image with a barcode reader to redeem the coupon.

As the use of electronic coupons has gained traction, fraudulent use of some coupons has been difficult to curtail. For example, one-time-use static barcodes are intended to be limited to one use per each instance of the barcode, but can often be quickly reproduced and distributed with commonly available tools that are accessible via mobile devices. Electronic distribution of a barcode has the potential to reach a vast number of people (e.g., tens of thousands of people, etc.) almost instantly. Entities related to brands or merchants that offer coupons in the form of one-time-use static barcodes must be vigilant to prevent fraudulent redemptions by unintended holders of the barcodes. Thus, the ability to prevent the fraudulent reuse of electronic coupons presents significant challenges to brands and merchants alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

Figure 1:
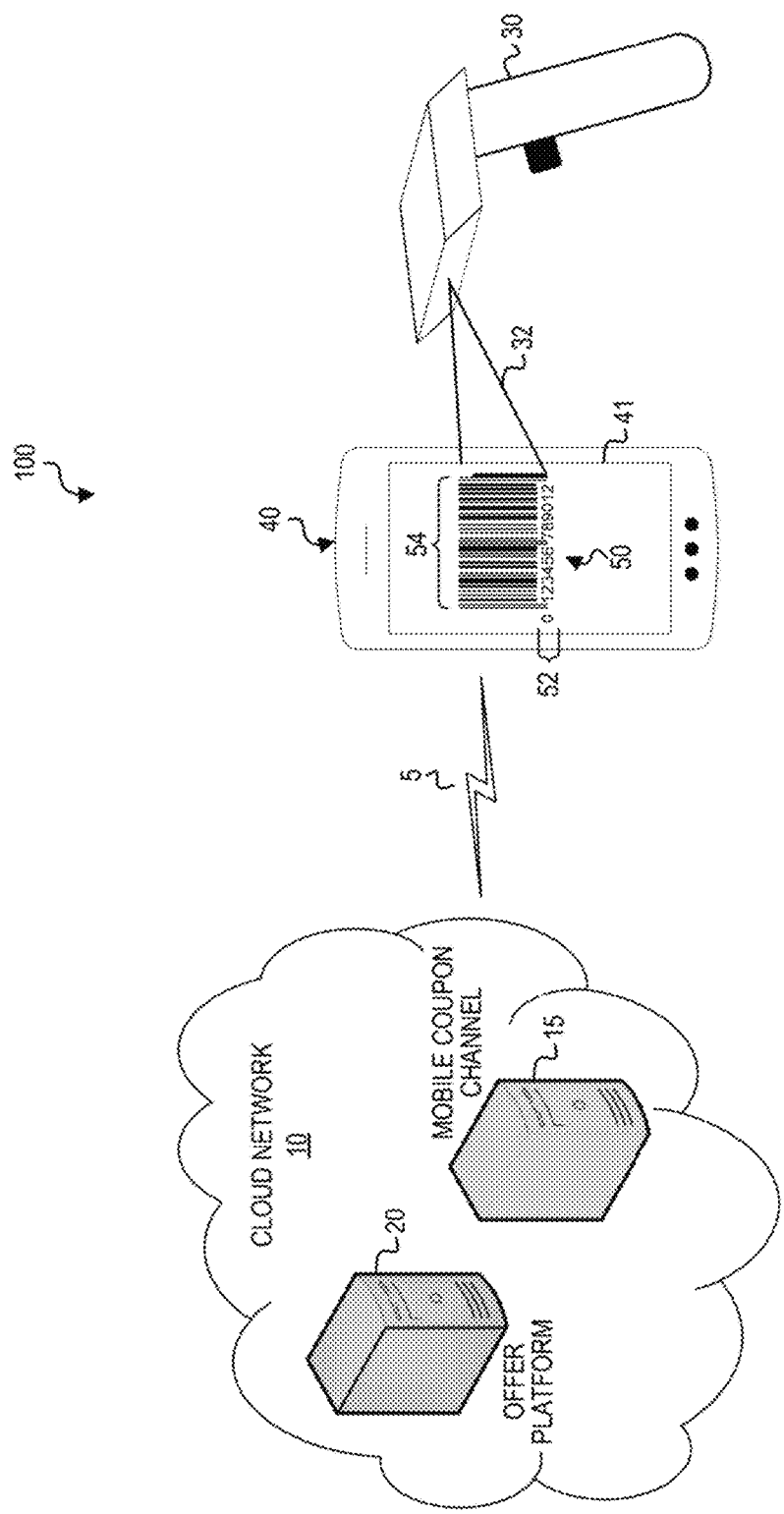
FIG. 1 is a simplified pictorial diagram illustrating a communication system for protecting against capturing barcodes on mobile devices according to an embodiment.

According to one aspect of the present disclosure, dynamic occlusions can be used to protect against capturing barcodes displayed in display screens on mobile devices. At least one embodiment can include determining a dynamic occlusion to be applied to a barcode, generating an object for displaying a series of images of the barcode with the dynamic occlusion where the barcode is to be scannable at least once based on the series of images to be displayed, and providing the object for access by the mobile device.

In specific embodiments, the dynamic occlusion includes a modification to a first portion of the barcode to create a first image of a modified barcode. The object, when displayed for a first time period, is to render the first image of the modified barcode for at least a first interval occurring within the first time period. The first portion of the barcode is unscannable during the first interval, and the first portion of the barcode is at least partially scannable during one or more other intervals of the first time period. The first time period may be equivalent to a duration of displaying one iteration of the series of images. In specific embodiments, the first image of the modified barcode includes an opaque layer masking the first portion of the barcode. In more specific embodiments, the object, when displayed for the first time period, is to render the series of images to show the opaque layer being shifted to mask successive portions of the barcode during successive intervals, respectively, of the first time period. In further specific embodiments, during a second interval of the first time period, the object is to render a second image of the series of images including a second opaque layer masking a second portion of the barcode and the first opaque layer removed to expose the first portion of the barcode. In yet further embodiments, the first image of the modified barcode is to include an opaque layer masking a complete image of the barcode, and the object is to further render a second image of the series of images with the opaque layer removed to expose the complete image of the barcode for a second interval occurring within the first time period. The second interval may not be more than one-tenth of one second. In other specific embodiments, the first portion of the barcode is at least one of a start indicator of the barcode and a stop indicator of the barcode.

Some or all of the elements, operations, and features described herein may be included in respective methods, systems, apparatuses, and devices for performing the described functionality of using dynamic occlusions to protect against capturing barcodes for fraudulent use when displayed on a mobile device. Furthermore, some or all of the features may be implemented in at least one machine readable storage medium.

Description

Reference will now be made to several embodiments, examples of which are illustrated in the accompanying FIGURES. Where practicable, similar or like reference numbers may be used in the FIGURES and may indicate similar or like functionality. The FIGURES depict embodiments described herein for purposes of illustration only. It will be readily apparent that alternative arrangements, configurations, elements, etc. are intended to be included in the broad scope of the present disclosure without departing from the principles described herein.

FIG. 1 is a simplified pictorial diagram illustrating a communication system 100 for protecting against capturing barcodes on mobile devices by using dynamic occlusion in a mobile network environment according to at least one embodiment described herein. Communication system 100 can include a cloud network 10 with an offer platform 20 that enables the creation of offers for electronic coupons. Offer platform 20 may also provide access to the electronic coupons embodied as barcodes in an electronic form, which can be displayed on a mobile device and scanned by a barcode scanner (also referred to as 'barcode reader'). One or more mobile coupon channels, such as mobile coupon channel 15, may also be accessible in cloud network 10. Examples of mobile coupon channels include, but are not limited to mobile web applications and social media websites. Offers may be accessed by mobile devices, such as a mobile device 40, via one or more networks, such as network 5. In at least some scenarios, mobile device 40 may access mobile coupon channel 15 to view and select offers. In other scenarios, mobile device 40 may access offer platform directly to view and select offers. Selecting an offer for redemption can cause a barcode in electronic form, such as barcode 50, to be displayed in a display screen 41 of mobile device 40. Barcode 50 includes a set 54 of scannable lines and white spaces along with a numeric representation 52 of the set. A scanner 30 is shown scanning barcode 50 using light 32. Light 32 could include a light emitting diode (LED) or a laser light, for example.

For purposes of illustrating certain example techniques of a communication system in which dynamic occlusion can be applied to a barcode displayed on a mobile device it is important to understand the activities related to one-time use static barcodes in a mobile network environment. The following foundational information may be viewed as a basis from which the present disclosure may be properly explained.

An electronic coupon (also referred to herein as 'mobile coupon') is often embodied as a scannable barcode that can be displayed on a screen of a mobile device (e.g., smartphone, tablet, etc.). A barcode is an optical, machine readable representation of data. The data can identify a particular product and a discount to be applied to the purchase price of the product (e.g., $1 off a particular soft drink, $0.50 off a bag of chips, etc.). It should be noted that, unless specifically noted otherwise, references herein to 'barcode' are intended to mean barcodes in an electronic form, such as those being displayed on a screen of a mobile device or a computer file (or object) containing the barcode that can be displayed on a screen of a mobile device.

Various types of barcodes can be used as electronic coupons. For example, Code 128 is a very high-density barcode symbology that is used for alphanumeric or numeric-only barcodes. Code 128 can encode all 128 characters of American Standard Code for Information Interchange (ASCII) and, by use of an extension character, Function 4 (FNC4), the Latin-1 characters. Latin-1 characters are defined in International Organization for Standardization and the International Electrotechnical Commission (ISO/IEC) 8859-1, Information technology—8-bit single-byte coded graphic character sets—Part 1: Latin alphabet No. 1, 1998. The Universal Product Code (UPC) is another barcode symbology and is widely used in the United States, Canada, United Kingdom, Australia, New Zealand, and other countries for tracking trade items in stores. International Article Number is another barcode example. International Article Number is also referred to as European Article Number (EAN-13). EAN-13 is a 13-digit barcode symbology, which is a superset of the original 12-digit UPC-A code.

A barcode can have particular characteristics that enable a scanner to decode input data obtained by scanning the barcode. A check digit is typically the last digit of a barcode and is calculated from all the other numbers in the barcode. The check digit is calculated to ensure the integrity of the barcode. Barcode symbology may also be encoded for handedness to enable a barcode scanner to determine the 'side' a symbol character is on. Handedness enables the scanner to determine whether it is moving left-to-right, right-to-left, top-to-bottom, or bottom-to-top across a barcode.

Barcodes can also contain indicators, which are special symbol characters used in barcodes to mark a specific location. For example, a start indicator is a special symbol character that may be provided in a barcode to mark the beginning of the barcode. A middle indicator is a special symbol character that may be provided in a barcode to mark the middle of a barcode. A stop indicator is a special symbol character that may be provided in a barcode to mark the end of a barcode.

Generally, one of two types of scanners are used to scan traditional barcodes embodied in paper and electronic barcodes displayed on a screen of a mobile device. A laser scanner is one type of scanner that can be used to scan a barcode displayed on a mobile device screen. Laser scanners use a laser beam as a light source and typically employ either a reciprocating mirror or a rotating prism to scan the laser beam back and forth across a barcode. An imager scanner is another type of scanner that can be used to scan a barcode displayed on a mobile device screen. An imager scanner functions more like a digital camera than a laser scanner, and is capable of reading two-dimensional symbologies. Rather than bouncing a read laser beam, an imager barcode scanner essentially takes a picture of the barcode, which is then analyzed.

Although laser scanners and imager scanners are typically used to read barcodes displayed on a mobile device, it should be apparent that embodiments described herein are compatible with any type of scanner capable of reading a barcode displayed on a mobile device. Examples of such barcode scanners include, but are not necessarily limited to pen-type scanners (e.g., light source and a photodiode at the tip of the pen), laser scanners (e.g., laser beam), LED scanners, camera-based readers (e.g., camera and image processing techniques), CCD reader (e.g., multiple light sensors to scan barcodes), video camera readers, large field-of-view readers, omnidirectional barcode scanners (e.g., decodes badly printed, crumpled, and even torn barcodes), cell phone cameras, and at least some smart phone scanners. Moreover, such scanners may include any suitable housing structure based on particular needs and implementations. Example housing structures include, but are not necessarily limited to handheld scanners (e.g., handle with a trigger) as illustrated by scanner 30 in FIG. 1, pen scanners (e.g., wand that is swiped), stationary scanners (e.g., wall or table mounted), fixed-position scanners, portable data assistant (PDA) scanners, automatic readers, and wireless scanners.

Generally, a barcode scanner can typically scan the black and white elements (or lines and spaces) of the barcode by illuminating the elements with a red light. A sensor in the barcode can detect the reflected light and generate an analog signal as the input data. The input data can be decoded by a barcode decoder to precisely determine the scanned barcode, even when certain errors are detected in the barcode. In one example, a barcode decoder can comprise one or more algorithms to transform input data from a barcode scanner into a string of text. The algorithms can apply error corrections to provide tolerances for imperfections in a barcode. For example, non-electronic barcodes presented on paper may have wrinkles, tears in the paper, written marks, etc. The algorithms of a barcode decoder can compensate for these imperfections to allow the input data that is obtained from scanning the barcode to be successfully interpreted and transformed despite the imperfections in the barcode image.

Although electronic coupons (also referred to herein as 'mobile coupons') are being used with more and more frequency, electronic coupons embodied as scannable barcodes are often ripe for fraudulent use. For example, electronic coupons embodied as one-time-use static barcodes are particularly susceptible to fraud when merchants (e.g., retailers that allow redemption of a mobile coupon) do not support one-time-use coupons. In some mobile coupon systems, a mobile coupon may be delivered to users as a static barcode that is displayed on a mobile device for a redeemable period of time during which the user can redeem the coupon. With one-time-use static barcodes, each user who obtains the mobile coupon receives the same barcode. The time window during which the barcode is displayed on the mobile device can vary, but in some implementations, it may last up to 15 minutes long. During this redemption period, the static barcode is vulnerable to being captured (e.g., by screenshotting, instantaneous distribution, and potentially fraudulent use. Once the barcode is displayed on a screen of a user's mobile device, a variety of readily available tools can be employed by the user to screenshot (i.e., take a picture) or otherwise capture the image of the displayed barcode. The copied barcode can then be easily shared with unintended and unauthorized recipients.

Fraudulent use of electronic coupons can have a tremendous negative impact for the source of a coupon. A source can be a product brand, manufacturer, or other entity that creates offers that are redeemable by mobile coupons. For example, once a screenshot is taken of a barcode displayed on a mobile device, instantaneous distribution can be achieved by uploading the screenshot to any number of public websites or by sending the screenshot via email using mass distribution lists as the recipients. Such tactics enable swift, mass distribution to unintended and unauthorized recipients. Consequently, actual redemptions of the coupon can significantly exceed the maximum number of coupons allocated by the source of the coupon for the particular coupon campaign. For example, if a source limits the number of mobile coupons to be distributed to 25,000, a mass distribution of the screenshotted barcode could cause the actual number of redeemed mobile coupons to far exceed the maximum 25,000, before the source is aware of the fraud and takes remedial action to close the campaign (e.g., blocking the mobile coupons from being accepted for redemption).

Attempts have been made to minimize the screenshotting of a barcode by adding metadata to the screen that is displaying the barcode. These data elements may include both static and dynamic elements such as location information, store information, and countdown timers. These approaches, however, leave the barcode in its original scannable form, and rely on human validation of the metadata at the point-of-sale (POS). Furthermore, some individuals have built mobile device applications (apps) to add metadata elements to a copied barcode to make it appear as though the copied barcode is legitimate. The approach of adding metadata to the screen with the barcode, but leaving the barcode unmodified entirely misses the fundamental vulnerability of screenshotting. Specifically, even when metadata is added, an image can still be easily generated that contains the complete barcode. For these reasons, adding metadata to a one-time-use static barcode has not sufficiently prevented fraudulent reuse of such barcodes.

Embodiments of a communication system, as described herein, can resolve the aforementioned issues (and more) by applying dynamic occlusion to one-time-use static barcodes that are displayed on mobile device display screens. As used herein, an 'occlusion' is intended to mean a first image and/or technique used in a display screen to mask, in whole or in part, a second image. Masking an image can include, but is not limited to, blocking, obfuscating, altering or modifying the image such that at least a portion of the image is rendered unscannable during the masking. An occlusion is dynamic when the masking of an image changes at least once during a particular time period (e.g., period of time during which a one-time-use static barcode is displayed and scannable for redemption on a screen of a mobile device). A system for applying dynamic occlusion to an electronic barcode exploits a barcode scanner's ability to overcome common occlusions, such as wrinkled or torn paper on which a non-electronic barcode is printed. Furthermore, algorithms are defined that create modifications (e.g., maskings) to the barcode in the time domain that eliminate or severely limit the presentation of the complete barcode at any instance in time. Thus, in some scenarios, these algorithms can apply dynamic occlusions that eliminate entirely the ability to capture the barcode in a single image using screenshotting. In other scenarios, these algorithms apply dynamic occlusions that significantly reduce the probability that a complete and accurate image of the barcode can be captured in a single image.

Several advantages can be achieved by communication system 100. First, applying a dynamic occlusion to a barcode can limit or eliminate the presentation of the complete or whole barcode on a mobile device screen at any instance in time. Furthermore, applying a dynamic occlusion may eliminate the need for human validation, which is often unreliable. By limiting or eliminating the presentation of a complete barcode, and by eliminating the need for human validation, a major fraud vector in mobile computing can be significantly reduced.

Figure 2:
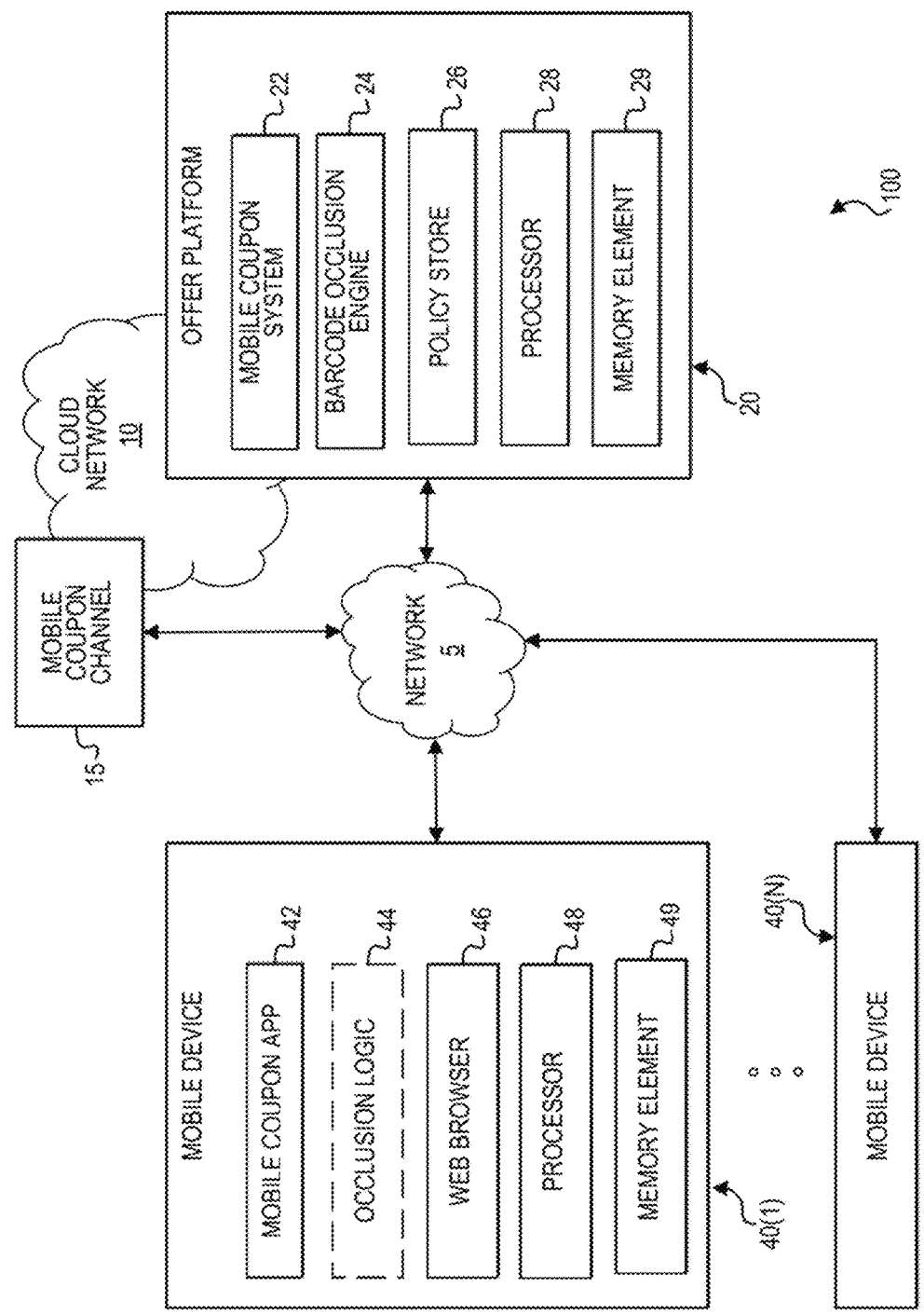
FIG. 2 is a simplified block diagram illustrating additional possible details of a portion of the communication system in a mobile network environment according to an embodiment.

Turning to FIG. 2, a block diagram illustrates possible details of certain components of communication system 100. Communication system 100 can include multiple mobile devices 40(1)-40(N), which can communicate to mobile coupon channel 15 and/or offer platform 20 via one or more networks such as network 5 and cloud network 10. For ease of illustration, possible components of these mobile devices are shown only in mobile device 40(1). It should be apparent, however, that such components may also be included in the other mobile devices. Furthermore, mobile device 40(1) is one possible configuration of mobile device 40. Mobile device 40(1) can include a mobile coupon application (mobile coupon app) 42, a web browser 46, a processor 48, and a memory element 49. In some embodiments, mobile device 40(1) may also include occlusion logic 44. Offer platform 20 can include a mobile coupon system 22, a barcode occlusion engine 24, a policy store 26, a processor 28, and a memory element 29. Although not shown, mobile coupon channel 15 may be provisioned in one or more network elements (e.g., server, etc.) with appropriate hardware, software, and/or firmware to achieve the desired functionality.

A description of possible infrastructure associated with communication system 100 is now provided. One or more elements of FIG. 2 (e.g., mobile devices 40(1)-40(N), mobile coupon channel 15, offer platform 20) may be coupled to one another through one or more interfaces employing any suitable connections (wired or wireless), which provide viable pathways for network communications. Additionally, any one or more of these elements may be combined or removed from the architecture based on particular configuration needs. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

Generally, communication system 100 can include any type or topology of networks (e.g., network 5, cloud network 10). Each of these networks represents a series of points or nodes of interconnected communication paths for receiving and sending network communications that propagate through the network. Communication system 100 may include any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment, or any suitable combination thereof, including wireless (e.g., cellular, 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wire line (e.g., Ethernet, etc.) communication. Generally, any suitable means of communication may be used: electric, sound, light, infrared, and/or radio.

A mobile device, such as mobile devices 40(1)-40(N), can be any type of mobile computing device that can be used to initiate network communications in a mobile network environment. In some embodiments, a mobile device can be associated with an end user who operates the mobile device to establish a network session in communication system 100 via some network. Mobile devices can include, but are not limited to, smartphones, tablets, laptops, portable digital assistants (PDAs), wearable devices, or any other mobile device, component, or element capable of initiating voice, audio, video, media, or data exchanges within communication system 100.

A mobile device (e.g., 40(1)) may include one or more processors (e.g., 48), including a graphics processing unit (GPU). The processor(s) may be associated with interfaces that support high-speed data transfer protocols such as a mobile industry processor interface (MIPI) and a high-definition multimedia interface (HDMI), for example, and may be coupled to a display such as an organic light emitting diode (OLED) display. A display of mobile device 40(1) may include a display screen capable of displaying text, graphics, and multimedia content, including electronic barcodes with various dynamic occlusions, at least some of which are shown and described herein. A suitable interface may also be provided in a mobile device to enable human user interaction with the mobile device. Suitable interfaces can include, but are not limited to, a display screen (e.g., display screen 41) configured as a touch screen to receive input from human fingers and/or devices (e.g., a stylus), a keypad, and/or sensor input devices (e.g., audio input device, visual/motion input device, etc.).

Communication system 100 may be inclusive of one or more network elements. Specifically, offer platform 20 and mobile coupon channel 15 may each comprise one or more network elements. As used herein, the term 'network element' is meant to encompass servers, server clusters, routers, switches, gateways, bridges, load-balancers, firewalls, appliances, inline service nodes, proxies, processors, modules, or any other suitable device, component, element, or appliance operable to exchange information in a network environment. A network element may include any suitable hardware, software, firmware, components, modules, or interfaces that facilitate the operations thereof. This may be inclusive of appropriate algorithms and communication protocols that allow for the effective exchange of data or information. Additionally, a network element may include physical hardware or a virtual implementation on physical hardware.

In an embodiment, offer platform 20 may provide various aspects of a system for providing mobile coupons to users of mobile devices. For example, mobile coupon system 22 can be configured to allow a source of mobile coupons (e.g., a brand) to create offers. An 'offer' as used herein, is intended to mean a proposal, created with electronic data in a computing system, for providing certain goods and/or services at a particular reduction or discount (e.g., percentage, actual amount, discount dependent on other purchases, free, etc.) in cost. A source may create a one-time use offer that is implemented as a one-time use static barcode provided to users who select and/or request redemption of the one-time use offer. In some scenarios, a one-time use offer can be selected by a user via an available mobile coupon channel, such as a mobile web application or a social media website. In other scenarios, a one-time use offer can be selected by a user via a landing page or website of an offer platform. In one example scenario, upon viewing the offer, the user may request redemption of the offer, which can cause an electronic barcode to be downloaded for display on a mobile device. In some instances, the electronic barcode can be displayed by a browser on the mobile device (e.g., via a mobile web app, a social media website, a landing page, or other website, etc.). In other scenarios, the electronic barcode can be downloaded to a mobile app on the mobile phone and displayed by the mobile app. Mobile coupon system 22 can also be configured to allow providers (e.g., retailers, merchants, etc.) to selectively opt-in to an offer that is created by a source. By opting-in to an offer, a retail location associated with the provider can allow redemption of a mobile coupon (e.g., a barcode) representing the offer, when the mobile coupon is presented for scanning at the retail location.

In an embodiment, barcode occlusion engine 24 of offer platform 20 can select a dynamic occlusion to be applied to a barcode associated with an offer. A dynamic occlusion can be selected dynamically (e.g., when a user has requested to redeem an offer) or can be predetermined. A predetermined dynamic occlusion can be selected during the configuration/creation of an offer or at any other suitable time prior to the request for redemption of an offer. In some instances, selection can be based on a policy of policy store 26. For example, a source of the offer may request a particular type of dynamic occlusion to be applied to the offer it creates. In other examples, barcode occlusion engine 24 can apply a single type of dynamic occlusion to every barcode. In another example, the type of dynamic occlusion may be randomly selected each time redemption of an offer is requested in order to further minimize the possibility of a user being able to capture the barcode image.

In yet further embodiments, barcode occlusion engine 24 can apply a particular type of dynamic occlusion to a particular type or types of barcodes. For example, the type of barcode may be determined based on its source, its associated product, its geographical location, the user, the type of mobile device, and/or any other relevant factor. The type of dynamic occlusion to apply to the barcode could be dynamically determined based on the identified type of the barcode. In addition, the type of dynamic occlusion to apply to a particular type of barcode could be based, at least partially, on the efficacy of dynamic occlusions previously applied to that type of barcode. Moreover, it should be noted that although this specification describes (for illustrative purposes) particular types dynamic occlusions, the broad scope of this disclosure is not so limited, and that any number of variations and modifications of dynamic occlusions are intended to be incorporated in the broad scope of this disclosure.

In an embodiment, barcode occlusion engine 24 can generate an object for displaying an animation in which a selected or predetermined dynamic occlusion is applied to a barcode. An animation is intended to mean a series of images that, when displayed in a sequence, create an illusion of movement that is perceptible by a human. Animation is also intended to mean a series of images in which at least one image has one or more modifications and, when presented in a sequence, the one or more modifications may not be perceptible by a human, or may only appear as a change rather than an illusion of movement. When a series of images is displayed, each image is displayed for an interval within a time period during which the series of images are displayed. The intervals corresponding to the images in the series may be configured as the same length of time or varying lengths of time. For example, an image containing an unmodified barcode may be displayed for a shorter interval than other images containing modifications to the barcode. In other examples, an image containing an unmodified barcode may be displayed for a same interval of time as other images containing modifications to the barcode. This may be possible due to each interval having an extremely short duration (e.g., less than or equal to 1/10 sec) in order to minimize the possibility of screenshotting the unmodified image.

An animation can be configured using various dynamic occlusion techniques to dynamically occlude the barcode without preventing the ability of a scanner to successfully scan the barcode. Generally, dynamic occlusion techniques include modifying at least one portion of a barcode for at least one interval of a time period during which a series of images is displayed. In one example technique, the modifying can include altering the at least one portion of the barcode (e.g., start and/or stop indicators). In another example technique, the modifying can include masking the at least one portion of the barcode with an opaque layer. An 'opaque layer' is intended to mean any area having any shape displayed in a display screen, where the opaque layer is sized and placed in an image to mask (e.g., block, obfuscate, etc.) at least a portion of the barcode when displayed. The opaque layer could be configured to have any design to accomplish this masking, such as being solid, cloudy, patterned, marbled, checked, milky, smoky, wavy, or any other design that renders the masked portion of the barcode unscannable. More specific examples of dynamic occlusion techniques include, but are not limited to, masking a portion of a barcode with an opaque layer such that the mask appears to 'move' across the barcode, masking different portions of the barcode with an opaque layer at different intervals, masking the entire barcode with an opaque layer and removing the opaque layer to briefly reveal (or flash) the barcode for very short segments of time, and temporarily altering certain portions of the barcode to make the barcode unscannable and correcting the alterations to briefly reveal the unaltered barcode for very short segments of time. A short segment of time can be an interval of a time period during which a series of images is being displayed.

In one possible implementation, an object generated by barcode occlusion engine 24 may be in the form of an animated graphics interchange format (GIF). In this implementation, barcode occlusion engine 24 can encode a barcode with a selected occlusion in an animated GIF. The animated GIF can contain multiple images or frames in a single file. Barcode occlusion engine 24 can create individual bitmap images of the barcode and the selected occlusion that make up the frames of a desired animation. The frames can be presented in a specific order by a browser on a mobile device to convey the animation. In other scenarios, a mobile application on a mobile device can display the animated GIF on a display screen of the mobile device.

A barcode with dynamic occlusion displayed as a series of images is 'scannable' if a barcode scanner is capable of capturing data that can be transformed to represent the full barcode from the series of images being displayed. Although a portion of the barcode may be unscannable (e.g., due to dynamic occlusion) at one or more intervals within a time period during which the series of images is displayed, the portion must be scannable during at least one interval of the time period in order for the full barcode to be captured over that series of images. In some types of dynamic occlusion, two or more different scannable segments of the barcode may be captured at two or more respective intervals and then transformed or reassembled by barcode reader algorithms to represent the complete barcode. Furthermore, a series of images of a barcode with dynamic occlusion may be configured to be scannable over a time period of any duration. However, in at least one embodiment the duration is configured to be between 100 milliseconds (ms) and 1 second (sec). For example, a series of images of a barcode with dynamic occlusion may be configured to be displayed for ½ second, during which time the barcode may be captured by a scanner. This time range may prevent a human operator from having to perform lengthy scans or giving up when a scan is not completed quickly enough. Moreover, the fragmentation of the complete barcode at such short intervals and required reassembly renders the ability of a human to reproduce the original complete barcode or any representation of it nearly impossible. Similarly, other types of dynamic occlusion in which the complete barcode is flashed for brief and/or randomized intervals also significantly reduces the ability to capture the barcode by screenshotting.

In at least one implementation, a series of images of a barcode with dynamic occlusion may be configured such that a scanner is capable of capturing the barcode over the duration of one iteration of the series. It should be apparent however, that the series of images could alternatively be configured with multiple scannable segments of the same or varying durations. In such an implementation, a scanner may capture the full barcode during any one of the multiple scannable segments of one iteration of the series.

An object in the form of an animated GIF can be provisioned in one or more mobile coupon channels (e.g., mobile coupon channel 15), a landing page or other website (e.g., of offer platform 20), or another suitable channel (e.g., mobile coupon app 42). When the animated GIF is accessed and displayed by a mobile device (e.g., by web browser 46 or mobile coupon app 42), the animated GIF may continue to loop for some time. In one example, a timer may be activated to allow the barcode to be displayed on the mobile device for a redemption period (e.g., 15 minutes, etc.). If the animated GIF is configured to loop indefinitely based on a looping factor (e.g., 'forever' looping setting), then the animated GIF can continue to loop (or repeat) until the timer expires. An external mechanism can detect the expiration of the timer and halt the object's display. In another example, a timer may not be configured and the animated GIF may run continuously until some other action halts the animation. This may be desirable in at least some cases since the dynamic occlusion prevents a user from screenshotting the barcode and consequently, may mitigate the need to limit the barcode's display with a timer or other mechanism. In this scenario, the animation may be halted if, for example, a user navigates their screen to another website, closes out of a mobile application displaying the barcode, or selects an option to end the display of the barcode. In yet another example, an animated GIF may be configured to loop a selected number of times to cause the barcode to be displayed for a particular length of time. For example, in order to cause a barcode to be displayed for 5 minutes when an iteration of the animation is 1 second long, the animated GIF could have a looping factor set to 300.

In at least some embodiments, an animated GIF can be dynamically updated by barcode occlusion engine 24. For example, a type of dynamic occlusion applied to a barcode may be changed while the offer associated with the barcode is still available for viewing, selection, and redemption by users. In this scenario, barcode occlusion engine 24 can create new or modified individual bitmap images of the barcode and the newly selected dynamic occlusion. The new or modified individual bitmap images make up the frames of a desired new or modified animation. An object with the new or modified animated GIF can be provisioned in the appropriate one or more mobile coupon channels to replace the old object. Thus, the dynamic occlusion technique may be updated in real-time.

An animated GIF is one possible non-limiting example of an implementation for applying dynamic occlusions to barcodes to be displayed on mobile devices. It should be appreciated, however, that other suitable types of animation techniques (or other suitable techniques) may be used instead. For example, other possible animation techniques include, but are not limited to, dynamic hypertext transfer markup language (dynamic HTML or DHTML) or java applets.

Mobile device 40(1) can be used by a user to display offers by communicating with offer platform 20 (e.g., via a landing page), mobile coupon channel 15 (e.g., mobile web application, social media website), or another suitable channel (e.g., mobile coupon app 42). The user can select, via the mobile device, one or more of the displayed offers via the particular channel being used. Mobile device 40(1) can receive an object containing a barcode that represents the selected offer and that is encoded with a dynamic occlusion to affect the presentation of the barcode when displayed. In some embodiments, the barcode and dynamic occlusion are encoded as an animated GIF. The browser can recognize the animated GIF and display its series of bitmap images in a sequence to display an animation in which the barcode is dynamically occluded. In other cases, a mobile application on the mobile device can display the animated GIF.

In other embodiments, mobile device 40(1) may receive an object containing the barcode without dynamic occlusions. In this embodiment, mobile coupon app 42 may include, or coordinate with, occlusion logic 44 to cause a dynamic occlusion to be applied to the barcode and displayed on the mobile device. Information indicative of the type of dynamic occlusion to be applied to the barcode may be received by the mobile device or may be identified by the mobile device, for example, based on policies locally or remotely accessible to the mobile device. In at least some embodiments, occlusion logic 44 may be configured to select a particular type of dynamic occlusion from multiple types of dynamic occlusion that may be used. In one example, the mobile coupon app could generate an animated GIF for displaying the barcode with the selected dynamic occlusion. The displayed animation can be scanned by a barcode scanner at a point-of-sale (POS) system to capture the barcode representing the selected mobile coupon and allow its redemption. The POS can be a retail location of a provider that opted-in to the offer in one possible scenario.

In an embodiment, when an offer for a one-time use coupon is selected for redemption via a mobile device, a barcode associated with the offer can be displayed on the mobile device for a predetermined redemption period (e.g., 15 minutes) or indefinitely. The displayed barcode on the mobile device can be presented to a point-of-sale (POS) system (e.g., at a retail location associated with the provider that opted-in to the offer). In embodiments described herein, the barcode is dynamically occluded while it is being displayed on the mobile device in order to protect against the capture and fraudulent reuse of the barcode. For example, in many scenarios in which dynamic occlusions are not implemented, a screenshot of the barcode could be taken and the coupon could be fraudulently redeemed based on the screenshot. The use of dynamic occlusions as disclosed herein, however, can prevent attempts to capture the image of a barcode displayed on a mobile device, while simultaneously enabling the barcode to be successfully scanned from the mobile device screen.

Figure 3:
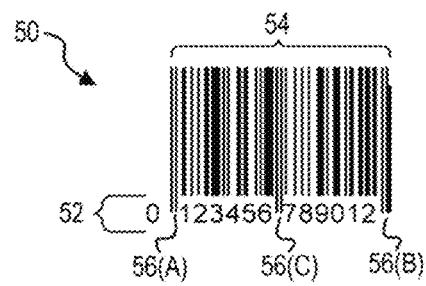
FIG. 3 is graphical illustration of an example barcode that may be used in the communication system according to an embodiment.

FIG. 3 is graphical depiction of example barcode 50, which could be a one-time use static barcode. Barcode 50 includes set 54 of multiple vertical black lines and multiple vertical white spaces. The black lines and white spaces may be configured in varied widths to convey particular information. For each adjacent pair of black lines, a white space is disposed therebetween. Barcode 50 comprises a start indicator 56(A), a stop indicator 56(B), and a middle indicator 56(C). In this example, start indicator 56(A) is located on the far-left side and includes two adjacent black lines with a white space therebetween, stop indicator 56(B) is located on the far-right side and includes two adjacent black lines with a white space therebetween, and middle indicator 56(C) is located in the middle and includes two adjacent black lines with a white space therebetween. The start, stop, and middle indicators can have variations (e.g. width, spacing, height, etc.) that are distinguishable by a barcode decoder. Barcode 50 also includes numeric representation 52 of the set 54 of black lines and white spaces.

Using dynamic barcode occlusion, a static barcode (e.g., barcode 50) can be displayed on a mobile device such that fraud is reduced by eliminating or limiting the probability of successfully capturing a complete and accurate image of the barcode. Capturing an image of a barcode on a mobile device for purposes of fraudulent reuse is often accomplished by screenshotting, which is a primary vector of mobile couponing fraud. Embodiments herein provide various techniques in which a barcode displayed on a screen of a mobile device is dynamically occluded such that, depending on the type of occlusion, either the entire barcode or portions of the barcode alternate between being not visually perceptible and unscannable, being visually perceptible and scannable, and being not visually perceptible but still scannable. In general terms, dynamic occlusion technology may be characterized by the following features: 1) The entire barcode is either never visibly displayed in a single image or the entire barcode is visibly displayed for a segment of time that is so brief that capturing the barcode is virtually impossible, and 2) The dynamic occlusions may be either visually perceptible to a human being or not visually perceptible to a human being.

In an embodiment, an occlusion technique includes masking (e.g., blocking, obfuscating, altering, modifying) portions of a barcode image in the time-domain using an algorithm that enables a scanner to successfully scan the barcode, but eliminates or significantly limits the possibility of a complete barcode being captured with a single screenshot. Dynamically applying occlusions to different portions of a barcode can be done in such a way that the complete barcode is never visibly displayed in a single image, while still ensuring the barcode remains scannable. Techniques that include this feature can eliminate or significantly limit the possibility of capturing the entire barcode in a single screenshotted image. In order to obtain a copy of the barcode, a user would be faced with the difficult task of taking multiple screenshots and trying to piece together the original coupon from the multiple screenshots.

Figure 4A:
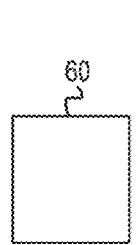
FIGS. 4(A)-4(C) are graphical illustrations of examples of dynamic occlusions that may be applied to a barcode in the communication system according to an embodiment.
Figure 4B:
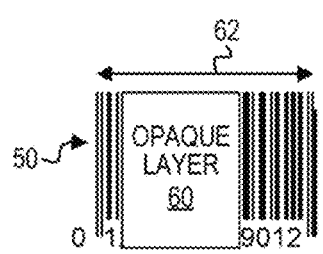
Figure 4C:
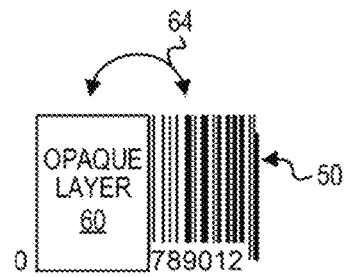

FIGS. 4(A)-4(C) illustrate examples of this type of dynamic occlusion technique in which different portions of a barcode are occluded at different times. In FIG. 4(A), an occlusion is illustrated as an opaque layer 60, which can be used to mask portions of a barcode in a time domain. For example, in FIG. 4(B), the opaque layer can move back and forth across barcode 50, possibly at a variable frequency, as indicated by directional arrow 62. In another example, in FIG. 4(C), opaque layer 60 can flip from left-to-right, from right-to-left, or both, such that it covers a portion of the barcode each time it is flipped. In the example of FIG. 4(C), opaque layer 60 covers approximately half of barcode 50 and then flips (or shifts) to cover the other half of the barcode as indicated by arrow 64. However, it should be apparent that any portion of the barcode may be covered by opaque layer 60 as long as opaque layer 60 is shifted or moved to reveal the masked barcode portion at least once in a time period during which the object is displayed on the mobile device. In a slight variation, opaque layer 60 could randomly mask different portions of the barcode. For example, the opaque layer could be shifted to mask different portions at random intervals and/or in a random order. Moreover, the size and/or shape of the opaque layer could randomly change.

In both embodiments shown in FIGS. 4(B) and 4(C), the complete image of barcode 50 is never visibly displayed. A barcode scanner can scan visible portions of barcode 50, which vary as the occlusion moves across the barcode or shifts to cover different sections of the barcode at different intervals of the time period during which the barcode is displayed. Once all portions of the barcode have been scanned, a barcode decoder can piece together the multiple sets of input data to transform the multiple sets into a single string representing the barcode.

In another embodiment, an occlusion technique can include masking the entire barcode in the time-domain using an algorithm that enables a scanner to successfully scan the barcode, while simultaneously reducing the probability that a screenshot can capture the entire barcode. Dynamically occluding the entire barcode at random intervals and for extremely brief durations can be done in such a way that the complete barcode is only present in a single image for a brief instance, while still ensuring the barcode remains scannable. This occlusion technique significantly reduces the probability of capturing the entire barcode in a single screenshotted image.

Figure 5:
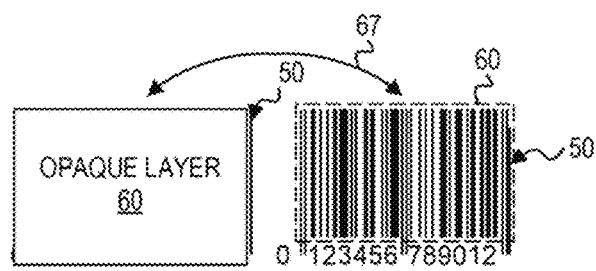
FIG. 5 is a graphical illustration of another example of a dynamic occlusion that may be applied to a barcode in the communication system according to an embodiment.

FIG. 5 illustrates an example of this type of dynamic occlusion technique in which the entire barcode is occluded during random or predetermined intervals of varied or the same duration. The occlusion, opaque layer 60, can cover the entire barcode 50, as shown on the left. The barcode can be exposed or flashed instantaneously at predefined or random intervals as indicated by 67. As shown on the right of FIG. 5, the complete image of the barcode may be visible for a flash period (e.g., brief instance such as $\frac{1}{100}$ of a second) to allow the barcode scanner to capture the image. The flash period, however, is configured to make screenshotting the image very difficult or impossible. In at least one embodiment, the length of the flash period does not exceed $\frac{1}{10}$ of a second. Additionally, the intervals between the flash periods (i.e., the intervals during which the barcode is occluded by opaque layer 60), may be randomized to help protect against screenshotting attempts. A barcode scanner can scan the image while it is occluded until the occlusion is removed to reveal the barcode for a flash period. During the flash period, the barcode scanner can read the barcode and generate input data as previously described herein or by using any other suitable scanning technique. A barcode decoder can transform the input data from the scan into a single string representing the barcode.

In a further embodiment, an occlusion technique that may be imperceptible to the human eye includes masking portions of a barcode in the time-domain using an algorithm that enables a scanner to successfully scan the barcode, but eliminating or greatly reducing the possibility of a complete barcode being captured with a single screenshot. Dynamically occluding portions of the barcode can be done in such a way that the complete barcode is never displayed in a single image or where the complete barcode is displayed only for a brief segment of time, and the occlusions are imperceptible to the human eye. This may eliminate the possibility of capturing the complete barcode in a single image, and has the added benefit of preventing the consumer from applying off-line image processing.

Figure 6:
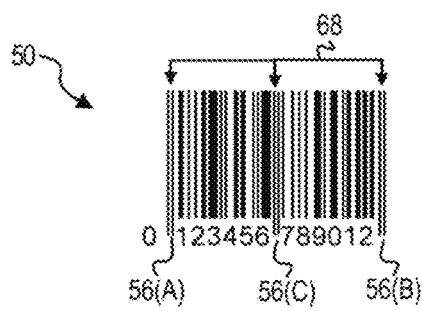
FIG. 6 is a graphical illustration of yet another example of a dynamic occlusion that may be applied to a barcode in the communication system according to an embodiment.

FIG. 6 is an example illustration of this type of dynamic occlusion technique in which the occlusion masks portions of a barcode, but is imperceptible to the human eye. In FIG. 6, indicators referenced at 68 are special symbol characters used in barcode 50 to mark a specific location of the barcode, which can help a barcode scanner read and decipher the barcode. These indicators include start, stop, and/or middle indicators 56(A), 56(B), and 56(C), respectively, and can be modified to obfuscate the barcode. In one example, the indicators can be modified to make them identical. For example, start indicator 56(A) can be adjusted to be identical to stop indicator 56(B). The indicators may then be slightly modified back to their original form. In one example, the modifications of the start and stop indicators back to their original forms may be performed during different time intervals, such that the complete image of the barcode is not shown. In other embodiments, the modifications of the start and stop indicators back to their original forms could be performed simultaneously at brief instances (e.g., at the same interval or intervals), similar to flash periods previously discussed herein. A barcode scanner can scan visible barcode 50, until it recognizes start indicator 56(A) and stop indicator 56(B), which may vary as the indicators are modified. Once all portions of the barcode have been scanned, a barcode decoder can piece together the multiple sets of input data to transform the multiple sets into a single string representing the barcode.

Figure 7:
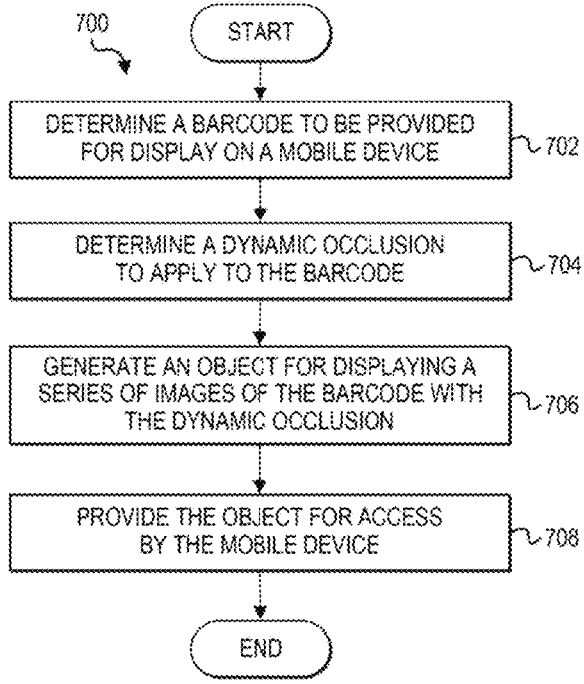
FIG. 7 is a simplified, high-level flowchart illustrating an example flow of possible operations that may be associated with the communication system according to an embodiment.

FIG. 7 is a simplified flowchart showing a flow 700 of operations that may be associated with using dynamic occlusions to protect against screenshots or otherwise capturing barcodes for fraudulent use on mobile devices. In at least one embodiment, one or more sets of operations correspond to activities of FIG. 7. Components of offer platform 20 (e.g., mobile coupon system 22, barcode occlusion engine 24, policy store 26, etc.) or portions thereof, may utilize the one or more sets of operations. These components may comprise means such as processors (e.g., processor 28) for performing the operations.

In an example, flow 700 may begin during or after the creation of an offer by a source. At 702, a one-time use static barcode representing the offer is determined, where the barcode is to be provided for display on one or more mobile devices used to select the offer and request redemption of the offer. At 704, a dynamic occlusion to be applied to the barcode is determined. In an embodiment, the dynamic occlusion may be selected from a plurality of possible dynamic occlusions. This selection may be based on policy, requirement of the mobile offer associated with the barcode, randomization, or any other suitable consideration. In another example, the occlusion engine can enable the dynamic injection of dynamic occlusions as a function of the barcode type (e.g., source, associated product, geographical location, user, mobile device, etc.). Different types of dynamic occlusions may be injected and applied to a barcode by the occlusion engine based on the efficacy of dynamic occlusions previously applied to barcodes or particular types of barcodes.

At 706, an object is generated for displaying a series of images of the barcode with the dynamic occlusion. In one example, the object is generated by encoding the barcode with the dynamic occlusion in an animated GIF. For example, a series of bitmap images (or pages) can be created using the barcode and an opaque layer masking a different portion of the barcode in each bitmap image. The particular portions of the barcode that are modified in the different bitmap images may depend on the type of dynamic occlusion being used (e.g., moving opaque layer as in FIG. 4(B), flipping opaque layer as in FIG. 4(C), flash periods using an opaque layer as in FIG. 5, etc.). The series of bitmap images can be ordered sequentially so that, when rendered in a display screen of a mobile device, a desired animation is presented. In another example using an animated GIF, a series of bitmap images can be created with the barcode having start and stop indicators modified to be identical. Some of the bitmap images can include the start indicator in its original form and some other bitmap images can include the stop indicator in its original form. In other examples, a few bitmap images may include both the stop and start indicators in their original forms to provide a flash period during at least one interval. The series of bitmap images can be ordered sequentially so that, when rendered in a display screen of a mobile device, a desired animation is presented. In some scenarios, bitmap images in a series may be ordered randomly. In one embodiment, an object is configured such that the barcode is scannable at least once based on the series of images to be displayed. In this embodiment, the barcode may be scannable over each iteration of the series of images. It should be noted, however, that a series of images could potentially be configured such that the barcode is scannable over multiple segments of varied durations in each iteration of the series of images.

The object may also be configured with a looping factor such that multiple iterations of the series of images is displayed. For example, a looping factor can be set to 'forever' such that when the object is displayed on a mobile device, the object renders the series of images repeatedly until halted by some external mechanism (e.g., code that detects timer expiration) or user action. In another example, the looping factor could be set to a particular number selected to enable the series of images to loop for a desired length of time. In yet a further example, the looping factor could be set to 1 or a small number and looping can be controlled by the display software that opens the object for display.

At 708, the object can be provided for access by the mobile device. For example, the object may be provisioned in a mobile coupon channel such as a mobile web application or a social media website. In other examples, the object may be provisioned as part of a landing page, for example, on offer platform 20. In yet other examples, the object may be provided to a mobile coupon app of a mobile device.

Once the object is provisioned in the desired one or more channels, a mobile device can access the object. For example, in the process of viewing and selecting an offer, the mobile device may obtain a link (e.g., uniform resource indicator/locator (URI/URL)) to the object in the mobile coupon channel. When the mobile device accesses the object, an animation that presents dynamic occlusion of the barcode can be displayed on the mobile device (e.g., via a browser of the mobile device) or downloaded to the mobile device and displayed by a mobile application on the mobile device. This animation can be scanned by a barcode scanner. The built-in tolerances of the algorithms in the barcode scanner can be leveraged to successfully transform the input data from the scanned animation to a string representing the barcode.

Figure 8:
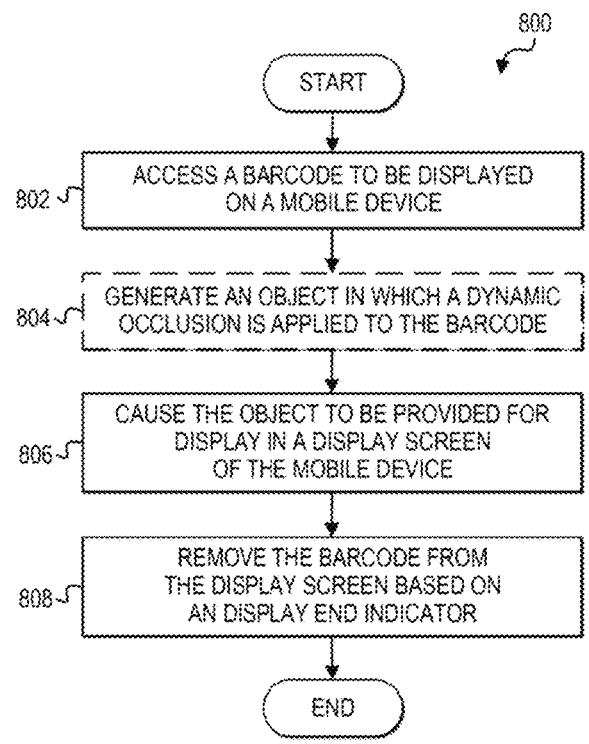
FIG. 8 is a simplified, high-level flowchart illustrating another example flow of possible operations that may be associated with the communication system according to an embodiment.

FIG. 8 is a simplified flowchart showing a flow 800 of operations that may be associated with using dynamic occlusions to protect against screenshots or otherwise capturing barcodes for fraudulent use on mobile devices. In at least one embodiment, one or more sets of operations correspond to activities of FIG. 8. In an embodiment, one or more operations of flow 800 may be performed by mobile web app 42, occlusion logic 44, and/or web browser 46 of mobile device 40(1). These components may comprise means such as processors (e.g., processor 48) for performing the operations. In at least one scenario, flow 800 can occur after an offer has been selected via mobile device 40(1) and redemption of the offer has been requested.

At 802, a barcode to be displayed on the mobile device is accessed. In some embodiments, an object containing the barcode encoded with a dynamic occlusion may be accessed by a web browser. In one example, the object may be an animated GIF. The object may be accessed by the web browser via a mobile coupon channel or a landing page, for example. In this embodiment, at 806, the web browser could cause the object to be provided for display in a display screen on the mobile device. In one example, providing the object for display includes providing an animation (e.g., a series of bitmap images) for display that is to present the barcode being dynamically masked (e.g., blocked, obfuscated, modified, altered). The animation may be configured to, when displayed, loop for a predetermined redemption period (e.g., 15 minutes or another time selected to allow redemption) or loop indefinitely until some other action (e.g., user action on the mobile device) halts the animation.

In other embodiments, at 802, the mobile coupon app may access a barcode by receiving the barcode. At 804, the mobile coupon app may apply dynamic occlusion to the barcode, for example, by generating an object with a series of appropriate bitmap images capable of rendering the desired animation. In other embodiments, the mobile coupon app may receive an object already-generated with dynamic occlusion applied to the barcode. Once the object is generated (or received), at 806, the mobile web app 42 can cause the object to be provided for display in a display screen on the mobile device. In one example, providing the object for display includes providing an animation (e.g., a series of bitmap images) for display that is to present the barcode being dynamically masked (e.g., blocked, obfuscated, modified, altered). The animation may be configured to, when displayed, loop for a predetermined redemption period (e.g., 15 minutes or another time selected to allow redemption) or loop indefinitely until some other action (e.g., user action on the mobile device) halts the animation.

At 808, a display end indicator may be triggered and consequently, the barcode (and possibly the entire series of images) may be removed or otherwise hidden on the display screen. In one embodiment, the display end indicator can be the expiration of a timer that was activated when the series of images was initially displayed on the mobile device. The timer can set a redemption period during which the series of images may be displayed on the mobile device. In at least one embodiment, during the redemption period, the object may continue looping to display iterations (e.g., each loop) of the series of images. Although particular intervals during each iteration may display unscannable portions of the barcode, the barcode as whole may be scannable over the duration of each iteration. For example, the scanner may successfully scan portions of the barcode during different intervals of a single iteration such that that barcode can be derived based on a combination of the successfully scanned portions from one iteration of the series.

In another embodiment, a timer may or may not be set, but a display end indicator can be triggered based on actions by a user. For example, a user may cause the mobile device to navigate away from the barcode being displayed, may select an option to end the barcode display, or may redeem the barcode (e.g., for systems in which the point of sale system is integrated with a back end controlling the barcode display). In yet another embodiment, a timer may not be set, but an object may be encoded to loop for a particular number of loops (e.g., by a looping factor in an animated GIF file) or for a particular amount of time. Thus, even if a timer is not set, an end display indicator may be triggered when the object ceases to loop. When the object is removed, in at least some embodiments, it may be permanently removed or destroyed so that it cannot be accessed again.

Variations and Implementations

In at least one implementation, certain elements of communication system 100 (e.g., offer platform 20, mobile coupon channel 15, mobile devices 40(1)-40(N)) include software to achieve (or to foster) the activities associated with electronic coupons, such as applying dynamic occlusions to barcodes as outlined herein. Note that in one example, the elements can have an internal structure (e.g., processors 28, 48, memory elements 29, 49, etc.) to facilitate some of the operations described herein. In other embodiments, these activities may be executed externally to these elements, or included in some other network element to achieve this intended functionality. Alternatively, offer platform 20, mobile coupon channel 15, and mobile devices 40(1)-40(N) may include this software (or reciprocating software) that can coordinate with other network elements in order to achieve the operations, as outlined herein. In still other embodiments, one or several devices may include any suitable algorithms, hardware, software, firmware, components, modules, interfaces, or logic that facilitate the operations thereof.

Note that in certain example implementations, the communication system outlined herein may be implemented by logic encoded in one or more machine readable storage media (e.g., embedded logic provided in an application specific integrated circuit (ASIC), digital signal processor (DSP) instructions, software (potentially inclusive of object code and source code) to be executed by a processor, or other similar machine, etc.), which can include transitory and/or non-transitory media. In some of these instances, memory elements (e.g., as shown in FIG. 2) can store data and information used for the operations described herein. This includes the memory elements being able to store software, logic, code, or processor instructions that are executed to carry out the activities described in this specification. A processor can execute any type of instructions associated with the data and information to achieve the operations detailed herein. In one example, a processor (e.g., as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described herein should be construed as being encompassed within the broad term 'processor.' Each of the components can also include suitable interfaces for receiving, transmitting, and/or otherwise communicating data or information in a network environment.

In one example implementation, offer platform 20 may include software modules (e.g., shown in FIG. 2) in order to achieve, or to foster, the activities outlined herein. These modules can be suitably combined or partitioned in any appropriate manner, which may be based on particular configuration and/or provisioning needs. The components of offer platform 20, mobile coupon channel 15, and mobile devices 40(1)-40(N) can include volatile and/or nonvolatile memory elements for storing data and information, including instructions and/or logic, to be used in achieving the dynamic occlusion activities as discussed herein. These components may further keep data and information in any suitable memory element (e.g., random access memory (RAM), read-only memory (ROM), programmable ROM (PROM), EPROM, EEPROM, a disk drive, a floppy disk, a compact disk ROM (CD-ROM), a digital versatile disc (DVD), flash memory, a magneto-optical disk, an application specific integrated circuit (ASIC), or other types of nonvolatile machine-readable storage media that are capable of storing data and information), software, hardware, firmware, or in any other suitable component, device, or element where appropriate and based on particular needs. Any of the memory items discussed herein should be construed as being encompassed within the broad term 'memory element.' Moreover, the information being used, displayed, tracked, provided, communicated, presented, transferred, distributed, passed, sent, or received in the communication system 100 could be provided in any repository, database, register, queue, table, cache, or other storage structure, all of which can be referenced at any suitable timeframe. Any such storage options may also be included within the broad term 'memory element' as used herein.

Note that with the examples provided herein, interaction may be described in terms of two, three, or more computing devices and/or network elements. However, this has been done for purposes of clarity and example only. In certain cases, it may be easier to describe one or more of the functionalities of a given set of flows by only referencing a limited number of computing devices or network elements. Moreover, communication system 100 is readily scalable and can be implemented across a large number of components, as well as more complicated/sophisticated arrangements and configurations. In addition, offer platform 20, mobile coupon channel 15, and mobile devices 40(1)-40(N) are illustrated and described with reference to certain elements (e.g., mobile coupon app 42, occlusion logic 44, web browser 46, mobile coupon system 22, barcode occlusion engine 24, policy store 26), and other components and data. However, it will be apparent that these elements may be configured with a large number of such components and these elements may be combined or divided in any suitable configuration to achieve the intended functionalities of any of the embodiments described herein. Accordingly, the examples provided should not limit the scope or inhibit the broad teachings of communication system 100 as potentially applied to a myriad of other architectures.

It is also important to note that the operations described herein illustrate only some of the possible dynamic occlusion activities that may be executed by, or within, communication system 100. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

As used herein, unless expressly stated to the contrary, use of the phrase 'at least one of' preceding multiple items (e.g., elements, conditions, activities, operations, etc.) is intended to mean any combination of the named items. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular items (e.g., element, condition, module, activity, operation, claim element, etc.) they modify, but are not intended to indicate any type of order, rank, importance, temporal sequence, or hierarchy of the items. For example, 'first X' and 'second X' are intended to designate two separate X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate activities associated with applying dynamic occlusions to barcodes, these elements and operations may be replaced by any suitable architecture, protocols, and/or processes that achieve the intended functionality of the communication system.

What is claimed is:

1. At least one machine readable medium including code that, when executed by one or more processors, causes the one or more processors to perform operations to:
   determine a dynamic occlusion to be applied to a barcode;
   generate an object for displaying a series of images of the barcode with the dynamic occlusion, the barcode to be scannable at least once based on the series of images to be displayed, wherein the dynamic occlusion includes a modification to a first portion of the barcode to create a first image of a modified barcode, wherein the object, when displayed for a first time period, is to render the first image of the modified barcode for at least a first interval occurring within the first time period, wherein the first image of the modified barcode includes an opaque layer masking the first portion of the barcode; and
   provide the object for access by a mobile device.

2. The at least one machine readable medium of claim 1, wherein the first portion of the barcode is unscannable during the first interval, and wherein the first portion of the barcode is at least partially scannable during one or more other intervals of the first time period.

3. The at least one machine readable medium of claim 1, wherein the first time period is equivalent to a duration of displaying one iteration of the series of images.

4. The at least one machine readable medium of claim 1, wherein the object, when displayed for the first time period, is to render the series of images to show the opaque layer being shifted to mask successive portions of the barcode during successive intervals, respectively, of the first time period.

5. The at least one machine readable medium of claim 1, wherein during a second interval of the first time period, the object is to render a second image of the series of images including a second opaque layer masking a second portion of the barcode and the opaque layer removed to expose the first portion of the barcode.

6. The at least one machine readable medium of claim 5, wherein the first portion of the barcode includes a first half of the barcode and the second portion of the barcode includes a second half of the barcode.

7. The at least one machine readable medium of claim 1, wherein the first image of the modified barcode is to include an opaque layer masking a complete image of the barcode, and wherein the object is to further render a second image of the series of images with the opaque layer removed to expose the complete image of the barcode for a second interval occurring within the first time period.

8. The at least one machine readable medium of claim 7, wherein the second interval is not more than one-tenth of one second.

9. The at least one machine readable medium of claim 1, wherein the first portion is at least one of a start indicator of the barcode and a stop indicator of the barcode.

10. The at least one machine readable medium of claim 1, wherein the series of images, when displayed for the first time period, is to render an animation of the barcode with the dynamic occlusion.

11. The at least one machine readable medium of claim 10, wherein the object is an animated graphics interchange format (GIF) file.

12. The at least one machine readable medium of claim 1, wherein providing the object for access by the mobile device is to:
provide the object in one of a mobile coupon channel or a landing page.

13. The at least one machine readable medium of claim 1, wherein providing the object for access by the mobile device is to include:
sending the object to a mobile application on the mobile device or to a mobile web application in a website.

14. The at least one machine readable medium of claim 1, wherein determining the dynamic occlusion is to include:
selecting the dynamic occlusion from a plurality of dynamic occlusions.

15. The at least one machine readable medium of claim 1, wherein the dynamic occlusion is selected based, at least in part, on a policy.

16. The at least one machine readable medium of claim 1, wherein the dynamic occlusion is selected based, at least in part, on a type of the barcode.

17. A method, comprising:
determining a dynamic occlusion to be applied to a barcode;
generating an object for displaying a series of images of the barcode with the dynamic occlusion, the barcode to be scannable at least once based on the series of images to be displayed, wherein the dynamic occlusion includes a modification to a first portion of the barcode to create a first image of a modified barcode, wherein the object, when displayed for a first time period, is to render the first image of the modified barcode for at least a first interval occurring within the first time period, wherein the first image of the modified barcode includes an opaque layer masking the first portion of the barcode; and
providing the object for access by a mobile device.

18. The method of claim 17, wherein a complete image of the barcode is not displayed on the mobile device during a period of time in which the object is being displayed.

19. An apparatus, comprising:
a memory element for storing instructions; and
a processor coupled to the memory element, wherein the processor is configured to execute the instructions to:
determine a dynamic occlusion to be applied to a barcode;
generate an object for displaying a series of images of the barcode with the dynamic occlusion, the barcode to be scannable at least once based on the series of images to be displayed, wherein the dynamic occlusion includes a modification to a first portion of the barcode to create a first image of a modified barcode, wherein the object, when displayed for a first time period, is to render the first image of the modified barcode for at least a first interval occurring within the first time period, wherein the first image of the modified barcode includes an opaque layer masking the first portion of the barcode; and
provide the object for access by a mobile device.

* * * * *